(12) United States Patent
Vivanco

(10) Patent No.: US 11,006,357 B2
(45) Date of Patent: May 11, 2021

(54) APPARATUS AND METHOD PROVIDING EFFICIENT DRX OPERATION FOR HIGH MOBILITY USER EQUIPMENT OVER 4G/5G NETWORK(S)

(71) Applicant: AT&T Technical Services Company, Inc., Vienna, VA (US)

(72) Inventor: Daniel Vivanco, Ashburn, VA (US)

(73) Assignee: AT&T Technical Services Company, Inc., Vienna, VA (US)

( * ) Notice: Subject to any disclaimer, the term of this patent is extended or adjusted under 35 U.S.C. 154(b) by 65 days.

(21) Appl. No.: 16/438,671

(22) Filed: Jun. 12, 2019

(65) Prior Publication Data

US 2020/0396682 A1 Dec. 17, 2020

(51) Int. Cl.
*H04W 52/02* (2009.01)
*H04W 36/08* (2009.01)
*H04W 76/28* (2018.01)
*H04W 36/16* (2009.01)
*H04W 76/27* (2018.01)
*H04W 76/38* (2018.01)
(Continued)

(52) U.S. Cl.
CPC . *H04W 52/0209* (2013.01); *H04W 36/00837* (2018.08); *H04W 36/08* (2013.01); *H04W 36/165* (2013.01); *H04W 36/32* (2013.01); *H04W 76/27* (2018.02); *H04W 76/28* (2018.02); *H04W 76/38* (2018.02)

(58) Field of Classification Search
CPC ......... H04W 52/0209; H04W 52/0225; H04W 52/0251; H04W 52/0254; H04W 76/27; H04W 76/28; H04W 76/38; H04W 36/08; H04W 36/24; H04W 36/32; H04W 36/16; H04W 36/165
See application file for complete search history.

(56) References Cited

U.S. PATENT DOCUMENTS

2010/0113023 A1\* 5/2010 Huang .............. H04W 52/0216
455/436
2010/0157927 A1\* 6/2010 Mochizuki .......... H04L 27/0006
370/329
(Continued)

OTHER PUBLICATIONS

Pasupuleti, Kumar S. , "How LTE Stuff Works?: Connected Mode DR", howltestuffworks.blogspot.com, Jun. 29, 2014, 10 pp.
(Continued)

*Primary Examiner* — Kevin D Mew
(74) *Attorney, Agent, or Firm* — Guntin & Gust, PLC; Jay Anderson

(57) ABSTRACT

Aspects of the subject disclosure may include, for example, detecting a transit speed of a device, resulting in a detected transit speed; responsive to the detected transit speed satisfying a first threshold, including information in a message related to a handover request between a first access point of a network and a second access point of the network, the information being indicative of an amount of time that the device has been in a Discontinuous Reception (DRX) mode; and sending, to the first access point with which the device communicates and is transitioning away from, the message including the information that is indicative of the amount of time that the device has been in the DRX mode. Other embodiments are disclosed.

20 Claims, 13 Drawing Sheets

(51) Int. Cl.
*H04W 36/32* (2009.01)
*H04W 36/00* (2009.01)

(56) References Cited

U.S. PATENT DOCUMENTS

| | | | |
|---|---|---|---|
| 2012/0108252 A1* | 5/2012 | Dimou | H04W 36/32 455/450 |
| 2013/0084869 A1* | 4/2013 | Johansson | H04W 76/20 455/436 |
| 2013/0201960 A1* | 8/2013 | Kim | H04W 74/0833 370/331 |
| 2014/0192729 A1* | 7/2014 | Kim | H04L 5/0042 370/329 |
| 2015/0141018 A1* | 5/2015 | Kapoulas | H04W 36/36 455/437 |
| 2015/0141021 A1* | 5/2015 | Kapoulas | H04W 36/30 455/441 |
| 2017/0048772 A1* | 2/2017 | Gheorghiu | H04L 5/0007 |
| 2017/0208523 A1* | 7/2017 | Yang | H04W 36/0088 |
| 2018/0049269 A1* | 2/2018 | Fujishiro | H04W 76/28 |
| 2018/0249417 A1* | 8/2018 | Fujishiro | H04W 76/28 |

OTHER PUBLICATIONS

Prakash, "Discontinuous Reception (DRX) in RRC_IDLE: Part 1", web.archive.org/web/20190419223146/http://lteuniversity.com/get_trained/expert_opinion1/b/prakash/archive/2013/04/17/discontinuous-reception-drx- . . . , Apr. 17, 2013, 3 pp.

Prakash, "Discontinuous Reception (DRX) in RRC_IDLE: Part 2", web.archive.org/web/20181017194313/http://lteuniversity.com/get_trained/expert_opinion1/b/prakash/archive/2013/04/24/discontinuous-reception-drx- . . . , Apr. 24, 2013, 4 pp.

* cited by examiner

```
rrcConnectionReconfiguration-r8
dedicatedInfoNASList: 1 item
    Item 0
        DedicatedInfoNAS: 27bd5ad9de05620ec101050403996d73090200000000000000...
radioResourceConfigDedicated
    drb-ToAddModList: 1 item
    ...
    mac-MainConfig: explicitValue (0)
        explicitValue
            ul-SCH-Config
            ...
            drx-Config: setup (1)
                setup
                    onDurationTimer: psf6 (6)
                    drx-InactivityTimer: psf1920 (20)
                    drx-RetransmissionTimer: psf16 (5)
                    longDRX-CycleStartOffset: sf1280 (19)
                        sf1280: 0
                    shortDRX
                        shortDRX-Cycle: sf10 (3)
                        drxShortCycleTimer: 10 shortDRX-cycles
            timeAlignmentTimerDedicated: infinity (7)
            phr-Config: setup (1)
                setup
                ...
            mac-MainConfig-v1020
physicalConfigDedicated
...
```

Receiving, by a processing system of a first evolved node B (eNB) including a processor, user equipment information associated with a mobile communication device, the user equipment information being received from a second eNB that is in communication with the mobile communication device, the user equipment information comprising an updated timer value, the updated timer value having been calculated by the second eNB based upon an amount of time that the mobile communication device had been in a Discontinuous Reception (DRX) mode

2204

Transmitting, by the processing system, a message to the mobile communication device, the message including the updated timer value

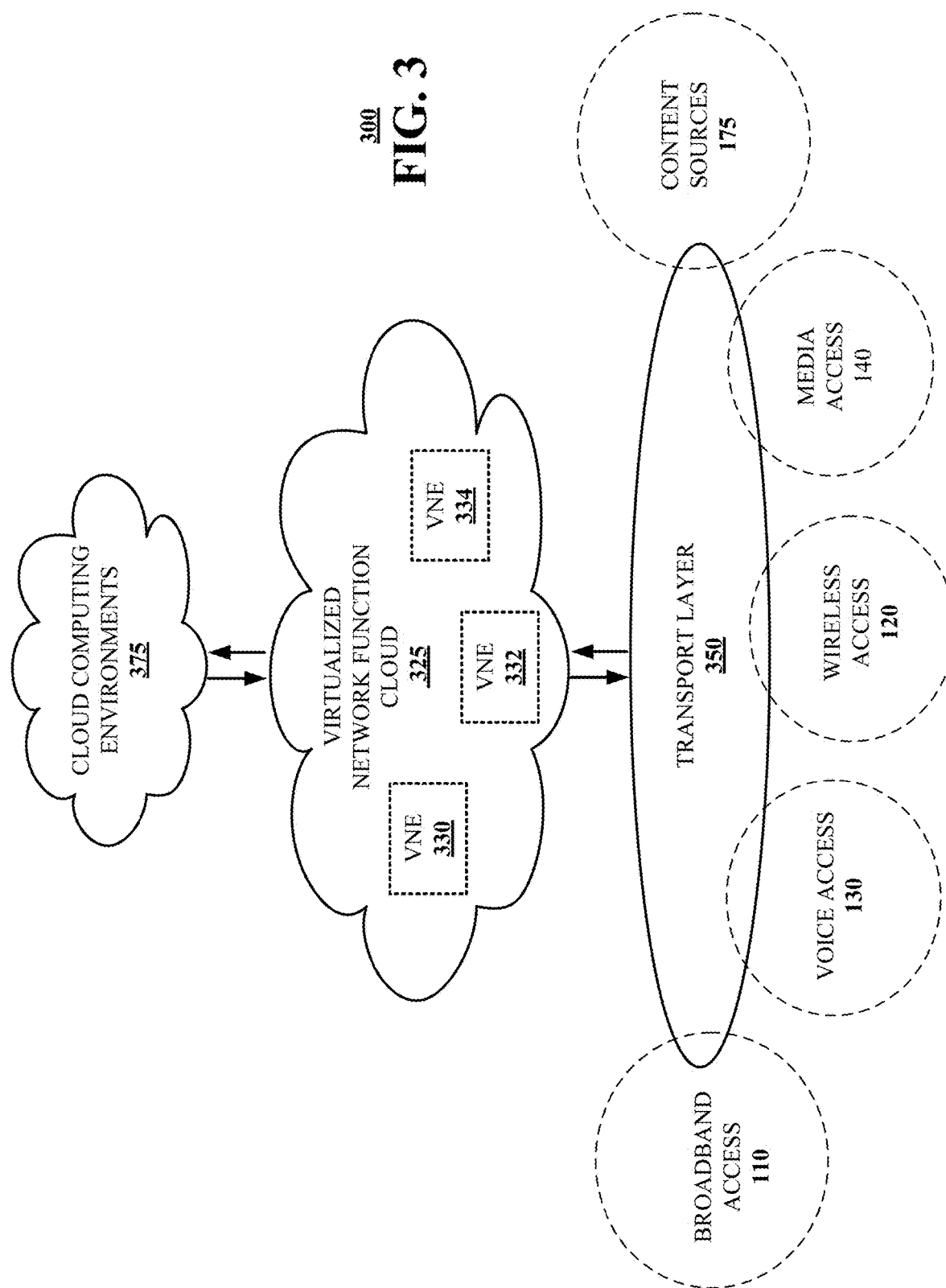

APPARATUS AND METHOD PROVIDING EFFICIENT DRX OPERATION FOR HIGH MOBILITY USER EQUIPMENT OVER 4G/5G NETWORK(S)

FIELD OF THE DISCLOSURE

The subject disclosure relates to an apparatus and method providing efficient Discontinuous Reception ("DRX") operation for high mobility user equipment. In one example, the DRX operation is in the context of a 4G network. In another example, the DRX operation is in the context of a 5G network. In another example, the efficiency can be in terms of power savings.

BACKGROUND

In 4G/5G technologies, power saving mechanisms specify periods of time in which the user equipment ("UE") goes to sleep mode and powers off its reception unit to save power. As seen in FIG. 1A (showing certain conventional operation of a UE), after each sleep period (or window), the UE wakes up and listens for a specific duration. During the listening interval, the UE checks for packet arrival, and verifies if it should return to awake mode. If no data packets have arrived, the UE goes back to sleep. Otherwise, the UE will transition to awake mode, and the evolved node B ("eNB") will schedule the data in the next frame.

4G technologies specify an awake/sleep scheduling mechanism, in which the UE may go from "light sleep period" to "deep sleep period" if data packets are not received for long period of time. There is a tradeoff between power saving, and data rate, since long sleep periods may yield transition delay (see, e.g., the "Transmission Delay" of FIG. 1A).

Referring now to FIGS. 1B and 1C, certain conventional LTE DRX Cycles are shown. As seen in these FIGS. 1B and 1C, after T1"seconds" of inactivity the UE goes to the Short DRX stage. During the Short DRX stage, the UE will wake up every P1 "seconds" (e.g., every 20 ms) to check for arrived packets. After T2 "seconds" (T2>T1), the UE goes to the Long DRX stage. During the Long DRX stage, the UE will wake up every P2 "seconds" (e.g., every 40 ms) to check for arrived packets (P2>P1). After T3 "seconds" (T3>T2), the UE goes to RRC-IDLE (where the radio bearer is released by the eNB). During the RRC-IDLE stage, the UE will wake up every P3 "seconds" (P3>P2) to check for arrived packets. In the RRC CONNECTED state the UE monitors the Physical Downlink Control Channel ("PDCCH") after waking up from DRX cycle. In the RRC_IDLE state, the UE monitors the paging channel to detect incoming calls.

Reference will now be made to certain aspects of a conventional DRX Cycle in the context of a moving UE. In particular, during the handover, the eNB instructs the UE in DRX mode to exit the DRX mode in order to participate in the handover. After the handover is completed, the UE again enters the DRX mode. The handover process includes multiple steps between the UE, the source eNB, the target eNB, and the ePC network (see, e.g., the conventional LTE X2 Handover Call-Flow (as defined in the 3GPP standards) shown in FIG. 1D). In general: (a) the source eNB issues a HANDOVER REQUEST message to the target eNB, passing necessary information to prepare the handover at the target side; (b) the target eNB accepts the request, and sends back the HANDOVER REQUEST ACKNOWLEDGE (a tunnel (X2) is created between source eNB and target eNB); (c) the source eNB starts forwarding the downlink data packets to the target eNB for all the data bearers; (e) the target eNB sends an RRC CONNECTION RECONFIGURATION message to the UE. The conventional RRC CONNECTION RECONFIGURATION message (see FIG. 1E) contains, among other parameters, a "drx-InactivityTimer". The drx-InactivityTimer specifies the amount of time that the UE should be active after having successfully received data. This timer is restarted upon receiving data packets for a new transmission (uplink (UL) or downlink (DL). Upon the expiry of this tinier the UE should go to DRX mode (see, e.g., FIG. 1B). A given network typically utilizes one value for the drx-InactivityTimer for all UEs (phone manufacturers typically push for a smaller value, in order to facilitate long battery life; on the other hand, network operators typically push for a larger value, in order to facilitate responsive networks).

Referring now to Table 1, below, certain conventional DRX Parameters are described.

TABLE 1

| DRX Parameter | Description |
| --- | --- |
| DRX Cycle | The duration of one 'ON time' + one 'OFF time'. (This value is not explicitly specified in RRC messages. This is calculated by the subframe time and longdrx-CycleStartOffset) |
| onDurationTimer | The duration of 'ON time' within one DRX cycle |
| drx-Inactivity timer | Specify how long UE should remain 'ON' after the reception of a PDCCH. When this timer is on UE remains in 'ON state' which may extend UE ON period into the period which is 'OFF' period otherwise. |
| drx-Retransmission timer | Specifies the maximum number of consecutive PDCCH subframes the UE should remain active to wait an incoming retransmission after the first available retransmission time |
| shortDRX-Cycle | DRX cycle which can be implemented within the 'OFF' period of a long DRX Cycle |
| drxShortCycleTimer | The consecutive number of subframes the UE shall follow the short DRX cycle after the DRX Inactivity Timer has expired |

Reference will now be made to an example case in which certain conventional UE operation is sub-optimal. In this example case, a UE is in DRX mode (Short or Long DRX-Cycle), i.e., the UE is not active but the UE is not in RRC IDLE mode. In this example, the UE is located in a dense LTE network (Macro, Pico, Femto, etc.) and is moving with high mobility (e.g., inside a train (such as a High Speed Train) or inside an automobile). In this scenario, the UE will perform frequent handovers from Source-Cell to Target-Cell due to the high speed and dense network. During a given handover, the source eNB instructs the UE in DRX mode to exit the DRX mode in order to participate in the handover. Therefore, using certain conventional operations, and due to the high mobility, the UE may not be able to stay in DRX mode or transition to RRC-IDLE mode (that is—the handover wakes up the UE; the UE then gets out of DRX mode into active mode; due to entering into the active mode, the UE can not transition from DRX mode to RRC-idle mode). As a result, the UE (using certain conventional operations) may not be able to achieve power saving benefits (which may lead to, for example, battery drainage). In one specific example of the above-mentioned sub-optimal operation, the drx-InactivityTimer is 30 sec and the UE handovers to other cells every 25 sec. In this case, the UE will handover to a target cell before the UE enters into RRC-IDLE mode, and therefore the drx-InactivityTimer will be reset every time UE attaches to the new cell.

BRIEF DESCRIPTION OF THE DRAWINGS

Reference will now be made to the accompanying drawings, which are not necessarily drawn to scale, and wherein:

FIG. 1E is a diagram showing certain aspects of a conventional RRC CONNECTION RECONFIGURATION message.

FIG. 2D depicts an illustrative embodiment of a method in accordance with various aspects described herein.

FIG. 3 is a block diagram illustrating an example, non-limiting embodiment of a virtualized communication network in accordance with various aspects described herein.

DETAILED DESCRIPTION

Figure 1A:
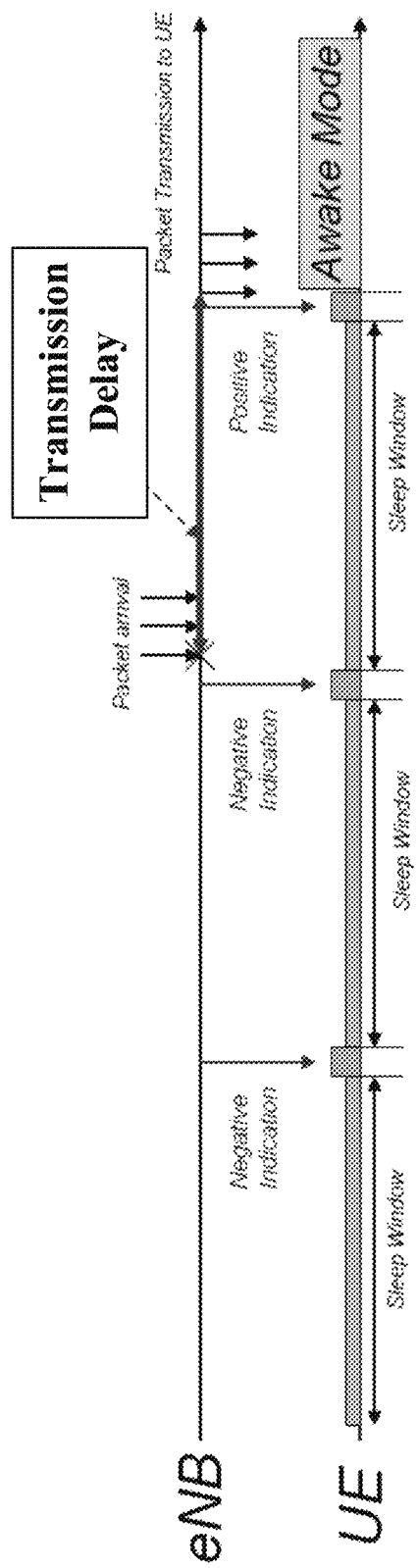
FIG. 1A is a diagram showing aspects of certain conventional eNB/UE operations.

The subject disclosure describes, among other things, illustrative embodiments for power saving features applicable to mobile communication devices (e.g., cell phones). Other embodiments are described in the subject disclosure.

One or more aspects of the subject disclosure include an apparatus for efficient DRX operation in the context of high mobility user equipment (e.g., movement of a mobile communication device at a relatively high rate of travel).

One or more aspects of the subject disclosure include a method for efficient DRX operation in the context of high mobility user equipment (e.g.: movement of a mobile communication device at a relatively high rate of travel).

Referring now to an embodiment, various additional steps and conditions are integrated into the existing 3GPP DRX-Procedure to support high mobility UEs (such as may operate in a dense network as described in the example case above). In one example, one or more embodiments can achieve various power saving benefits. In one example, algorithms are installed in the UE and LTE-RAN elements (e.g., eNB and/or MME): In one example, an algorithm customizes (for a given UE) a conventional RRC CONNECTION RECONFIGURATION message (as described herein the RRC CONNECTION RECONFIGURATION message is sent from a Target-eNB to a UE for use by the UE during handover).

In one specific example, an embodiment (such as in the form, for example, of one or more algorithms) operates as follows: (a) If a high number of handovers are detected for a given UE (detected by the LT and/or detected by one or more parts of a network) then perform steps (b)-(g); (b) estimate (and/or otherwise determine) a speed of the UE (in one example, an algorithm operating on the UE can perform the estimation/determination; in another example, an algorithm operating on one or more parts of a network can estimate/determine the speed (in this latter example, the UE can be informed by the network of the estimated/determined speed)); (c) responsive to the estimated/determined speed meeting a speed threshold (e.g., speed=HIGH_SPEED where HIGH_SPEED is at least 100 miles per hour), including by the algorithm operating at the UE 2 new fields in the HANDOVER REQUEST message (the 2 new fields of this example are: HIGH_SPEED_UE=TRUE; and the amount of time that the UE has been in DRX mode already (i.e. "Time_X")—note that this HANDOVER IREQUEST message is sent from the UE to the Source-eNB during Handover); (d) receiving, by an algorithm operating at the source eNB, the HANDOVER REQUEST message (with the 2 new aforementioned fields as populated by the UE) and modifying, by the algorithm operating at the source eNB, the drx-InactivityTimer of this particular UE to drx-InactivityTimer=drx-InactivityTimer−Time_X (that is, subtracting the value of Time_X from the previously existing value of drx-InactivityTimer for this particular UE): (e) including (together with UE Context) the updated drx-InactivityTimer from step (d) in the UE information passed from the source eNB to the target eNB during handover; (f) sending, by the target eNB, the updated drx-InactivityTimer value (that had been received from the source eNB) to the UE through conventional RRC CONNECTION RECONFIGURATION messaging (wherein the "drx-InactivityTimer" value that is sent to the UE by the target eNB is the updated drx-InactivityTimer value that has been customized far that particular UE); and (g) using, by that particular UE, the updated drx-InactivityTimer (use of which can result in efficient power savings).

In one specific example, one or more of the above steps can be iterated (e.g., iterative speed estimation/determination and iterative updating of the drx-InactivityTimer). In one specific example, the value of "Time_X" can continue to increase during the iterations. In another example, the updating of the value of "Time_X" for the particular UE can depend upon the speed of the UE and/or the density of the network environment (e.g., the physical proximity of the source eNB(s) and the target eNB(s)).

As described herein, various embodiments provide a methodology for efficient DRX operation for high mobility UEs over 4G/5G network(s).

As described herein, an RRC CONNECTION RECONFIGURATION message can include for each particular UE a drx-InactivityTimer value that has been customized far that particular UE. That is, various UEs (each communicating, for example, with a given source eNB, with a given set of source eNBs, with a given target eNB and/or with a given set of target eNBs) can each have different drx-InactivityTimer values.

As described herein, various embodiments can significantly improve battery life of UEs located in high mobility vehicles (e.g., drones, high speed trains, airplanes, automobiles, trucks) while traversing over dense 4G/5G network(s).

Various embodiments can facilitate a reduction in UE battery drain in cases, for example, when the UE is not being used.

As described herein, in various embodiments the network informs the UE of the DRX-Timing using an RRC ConnectionReconfiguration message or an RRC Connection Setup message.

As described herein, various embodiments can be applied to a UE (e.g., a phone) that is in a vehicle travelling, on a highway (e.g., a highway in a vicinity of a city).

In one embodiment, the target-eNB receives the updated drx-InactivityTimer value from the source-eNB (e.g., directly or indirectly via a handover request message from the source-eNB). In another embodiment, the target-eNB receives the updated drx-InactivityTimer value from the UE (e.g., directly or indirectly via a handover request message from the UE).

In one embodiment, a number of handovers can be a function of network density and vehicle speed (in this embodiment, the larger the number of handover events over a period of time, the shorter the time the UE will spend connected to the serving cell before handover to the next cell).

Figure 2A:
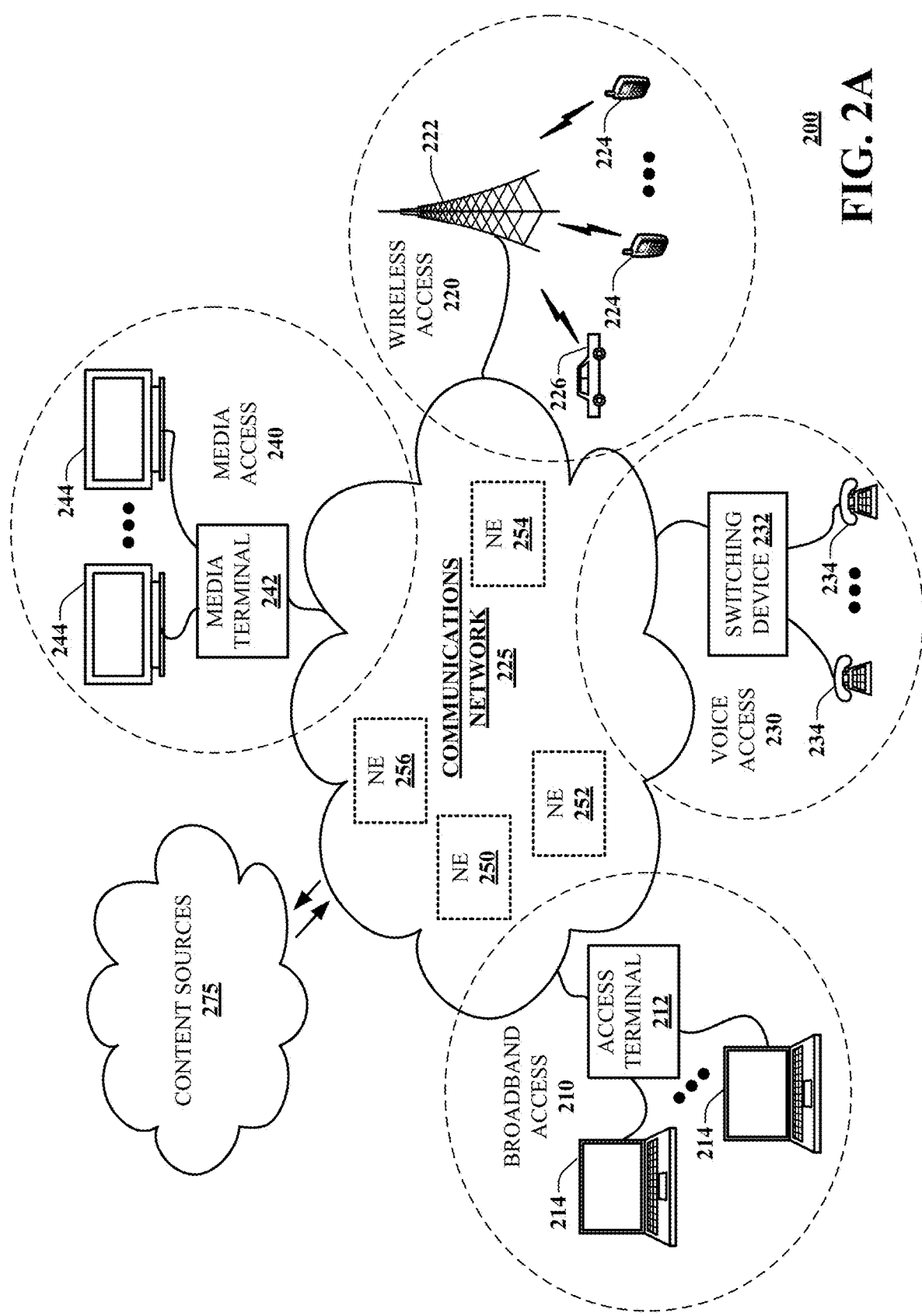
FIG. 2A is a block diagram illustrating an exemplary, non-limiting embodiment of a communication network in accordance with various aspects described herein.

Referring now to FIG. 2A, a block diagram is shown illustrating an example, non-limiting embodiment of a communication network 200 in accordance with various aspects described herein. For example, communication network 200 can facilitate in whole or in part various DRX mode operational efficiency aspects described herein (e.g., power savings).

In particular, a communications network 225 is presented for providing broadband access 210 to a plurality of data terminals 214 via access terminal 212, wireless access 220 to a plurality of mobile devices 224 and vehicle 226 via base station or access point 222 voice access 230 to a plurality of telephony devices 234, via switching device 232 and/or media access 240 to a plurality of audio/video display devices 244 via media terminal 242. In addition, communication network 225 is coupled to one or more content sources 275 of audio, video, graphics, text and/or other media. While broadband access 210, wireless access 220, voice access 230 and media access 240 are shown separately, one or more of these forms of access can be combined to provide multiple access services to a single client device (e.g., mobile devices 224 can receive media content via media terminal 242, data terminal 214 can be provided voice access via switching device 232, and so on).

The communications network 225 includes a plurality of network elements (NE) 250, 252, 254, 256, etc. for facilitating the broadband access 210, wireless access 220, voice access 230, media access 240 and/or the distribution of content from content sources 275. The communications network 225 can include a circuit switched or packet switched network a voice over Internet protocol (VoIP) network, Internet protocol (IP) network, a cable network, a passive or active optical network, a 4G, 5G, or higher generation wireless access network. WIMAX network, UltraWideband network, personal area network or other wireless access network, a broadcast satellite network and/or other communications network.

In various embodiments, the access terminal 212 can include a digital subscriber line access multiplexer (DSLAM), cable modem termination system (CMTS), optical line terminal (OLT) and/or other access terminal. The data terminals 214 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 222 can include a 4G, 5G, or higher generation base station, an access point that operates via an 802.11 standard such as 802.11n, 802.11ac or other wireless access terminal. The mobile devices 224 can include mobile phones, e-readers, tablets, phablets, wireless modems, and/or other mobile computing devices.

In various embodiments, the switching device 232 can include a private branch exchange or central office switch, a media services gateway, VoIP gateway or other gateway device and/or other switching device. The telephony devices 234 can include traditional telephones (with or without a terminal adapter), VoIP telephones and/or other telephony devices.

In various embodiments, the media terminal 242 can include a cable head-end or other TV head-end, a satellite receiver, gateway or other media terminal 242. The display devices 244 can include televisions with or without a set top box, personal computers and/or other display devices.

In various embodiments, the content sources 275 include broadcast television and radio sources, video on demand platforms and streaming video and audio services platforms, one or more content data networks, data servers, web servers and other content servers, and/or other sources of media.

In various embodiments, the communications network 225 can include wired, optical and/or wireless links and the network elements 250, 252, 254, 256, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2B:
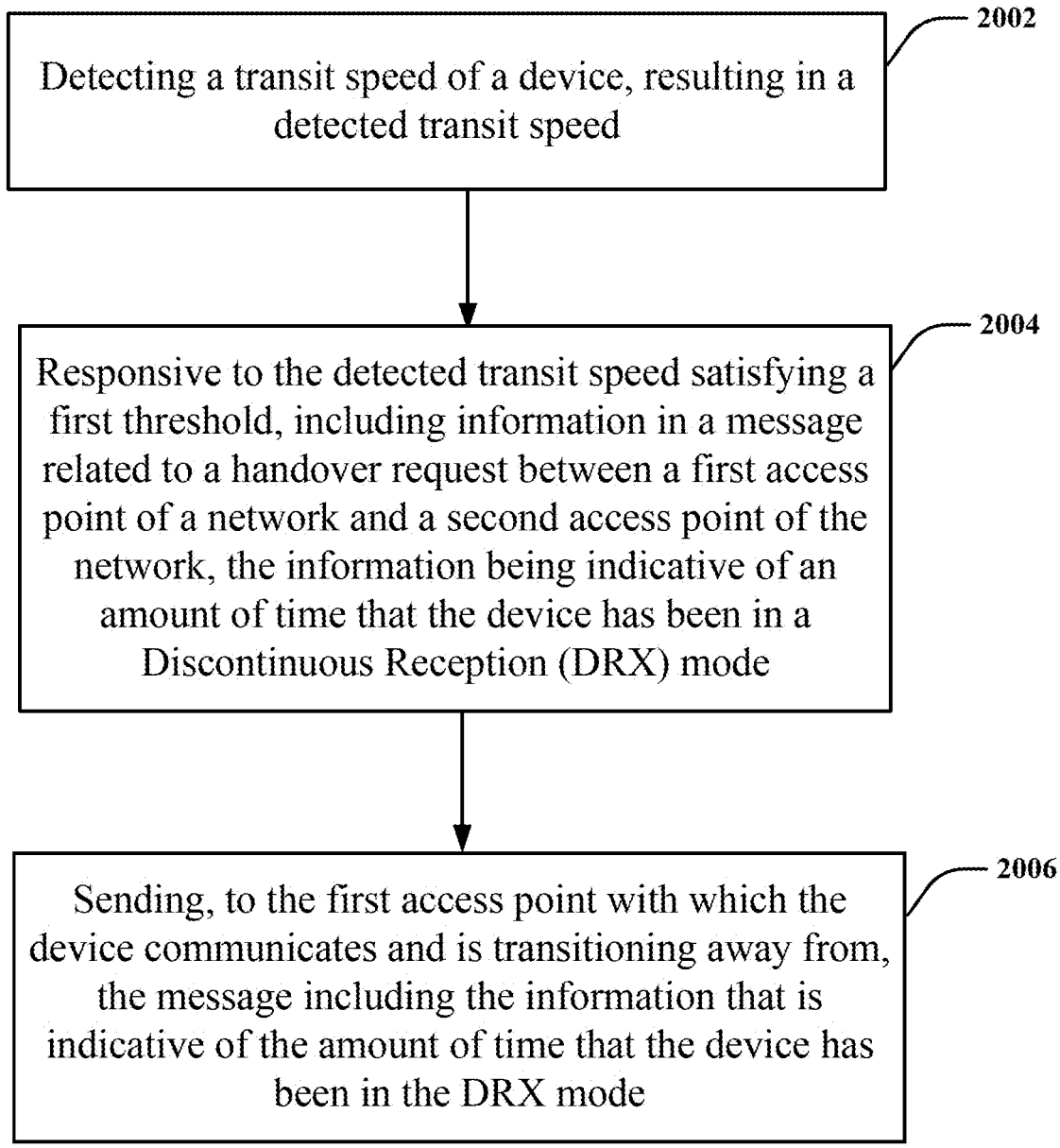
FIG. 2B depicts an illustrative embodiment of a method in accordance with various aspects described herein.

Referring now to FIG. 2B, various steps of a method 2000 according to an embodiment are shown. As seen in this FIG. 2B, step 2002 comprises detecting a transit speed of a device, resulting in a detected transit speed. Next, step 2004 comprises responsive to the detected transit speed satisfying a first threshold, including information in a message related to a handover request between a first access point of a network and a second access point of the network, the information being indicative of an amount of time that the device has been in a Discontinuous Reception (DRX) mode. Next, step 2006 comprises sending, to the first access point with which the device communicates and is transitioning away from, the message including the information that is indicative of the amount of time that the device has been in the DRX mode.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In another embodiment the steps of FIG. 2B can further comprise detecting a number of handovers that the device has experienced, resulting in a detected number of handovers. In one example, the detecting the transit speed of the device is responsive to the detected number of handovers satisfying a second threshold (e.g., at or above a certain number of handovers within a given time period). In one example, the detecting of the number of handovers can be performed by the device. In another example, the detecting of the number of handovers can be performed by one or more parts of the network with which the device communicates. For instance, the part(s) of the network can detect the number of handovers and then, responsive to the number of handovers satisfying a threshold, the part(s) of the network can inform the device (e.g., via a message or the like) that the threshold of handovers has been satisfied. The device can then, responsive to receipt of the message from the part(s) of the network, perform the speed detection and/or the sending of the message with the information that is indicative of the amount of time that the device has been in the DRX mode.

In another embodiment, the step of detecting a transit speed of the device can be replaced by the step of detecting a number of handovers that the device has experienced (wherein the including the information in a message and/or the sending of the message with the information can be responsive to the detected number of handovers satisfying a threshold).

Figure 2C:
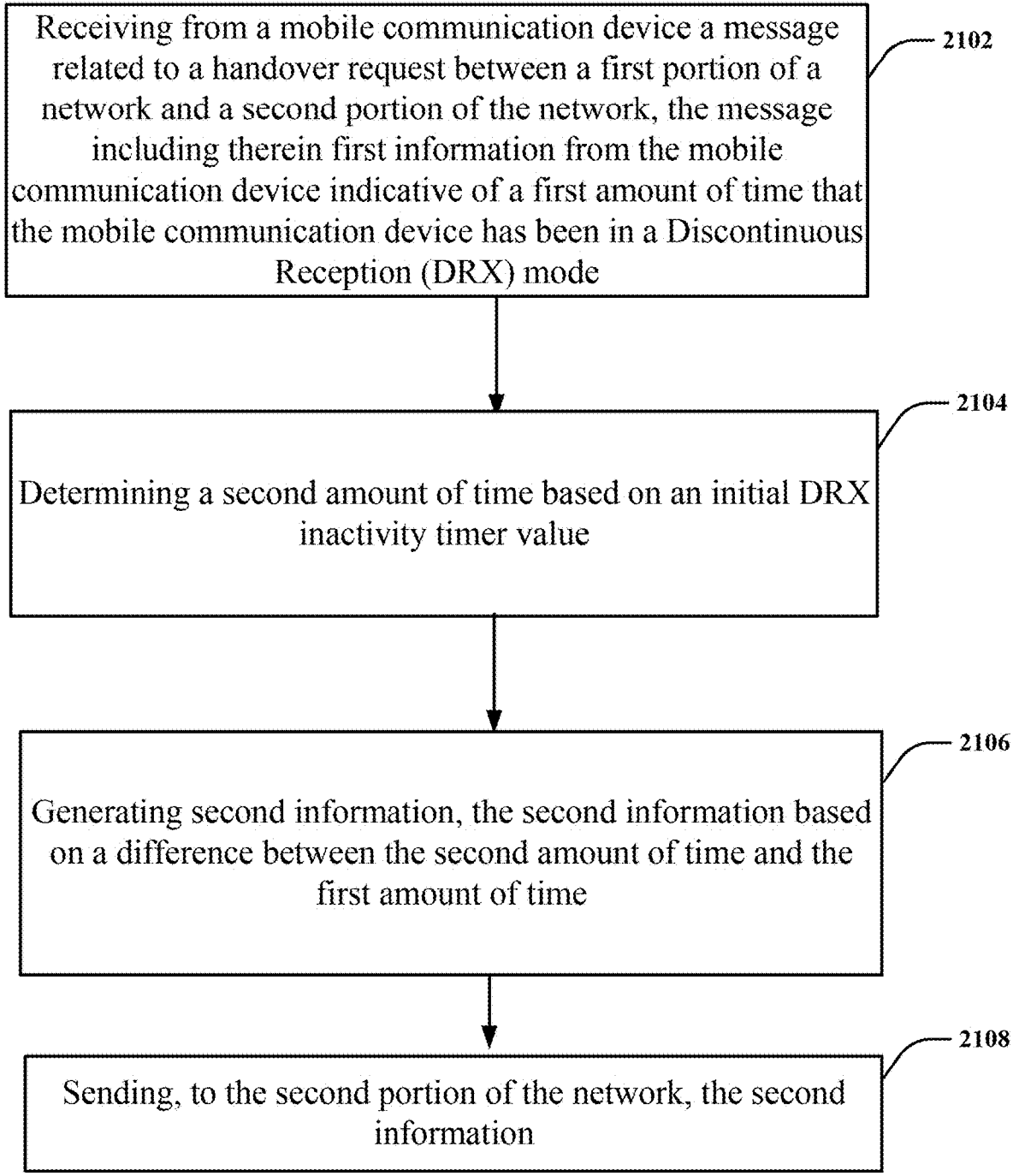
FIG. 2C depicts an illustrative embodiment of a method in accordance with various aspects described herein.

Referring now to FIG. 2C, various steps of a method 2100 according to an embodiment are shown. As seen in this FIG. 2C, step 2102 comprises receiving from a mobile communication device a message related to a handover request between a first portion of a network and a second portion of the network, the message including therein first information from the mobile communication device indicative of a first amount of time that the mobile communication device has been in a Discontinuous Reception (DRX) mode. Next, step 2104 comprises determining a second amount of time based on an initial DRX inactivity timer value. Next, step 2106 comprises generating second information, the second information based on a difference between the second amount of time and the first amount of time. Next, step 2108 comprises sending, to the second portion of the network, the second information.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2D various steps of a method 2200 according to an embodiment are shown. As seen in this FIG. 2D, step 2202 comprises receiving, by a processing system of a first evolved node B (eNB) including a processor, user equipment information associated with a mobile communication device, the user equipment information being received from a second eNB that is in communication with the mobile communication device, the user equipment information comprising an updated timer value, the updated timer value having been calculated by the second eNB based upon an amount of time that the mobile communication device had been in a Discontinuous Reception (DRX) mode. Next, step 2204 comprises transmitting, by the processing system, a message to the mobile communication device, the message including the updated timer value.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 1B:
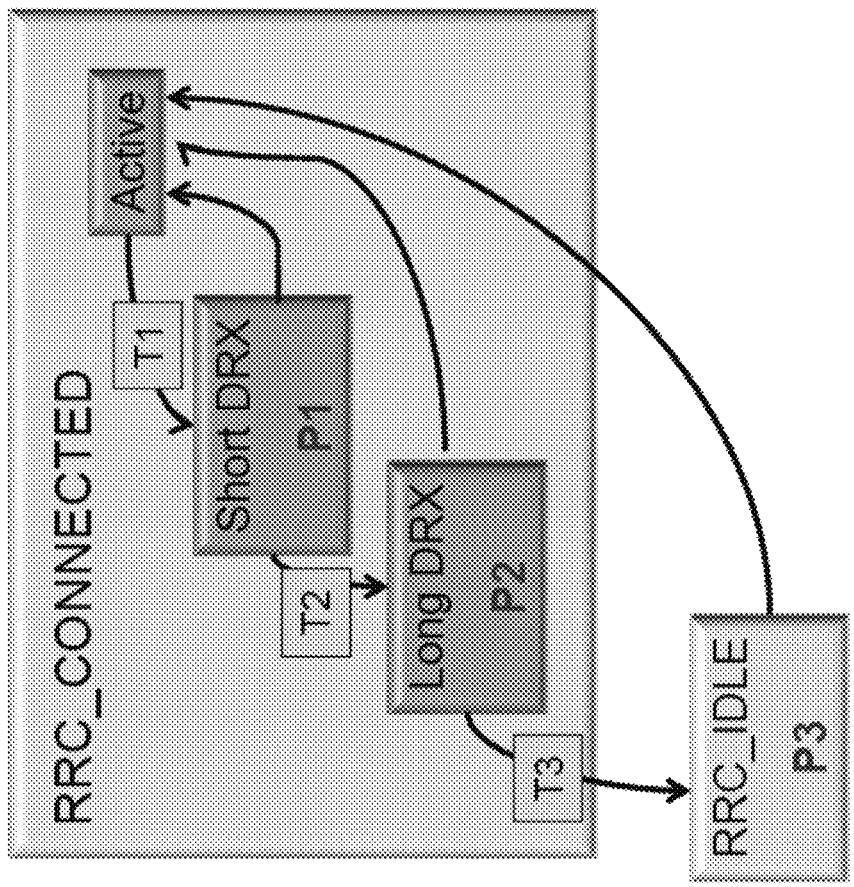
FIGS. 1B and 1C, are diagrams showing aspects of certain conventional LTE (Long Term Evolution) DRX Cycles.
Figure 1C:
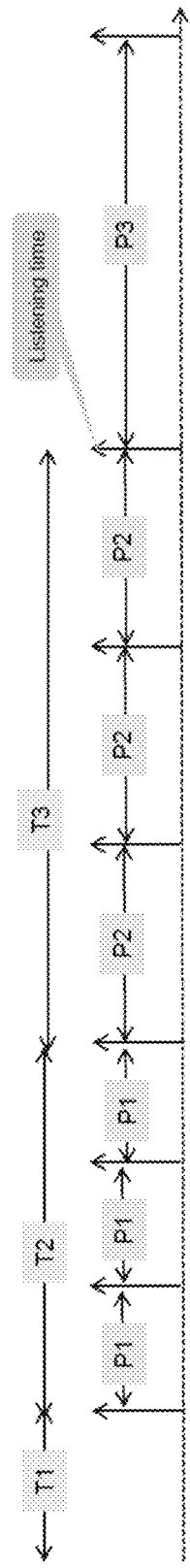
Figure 1D:
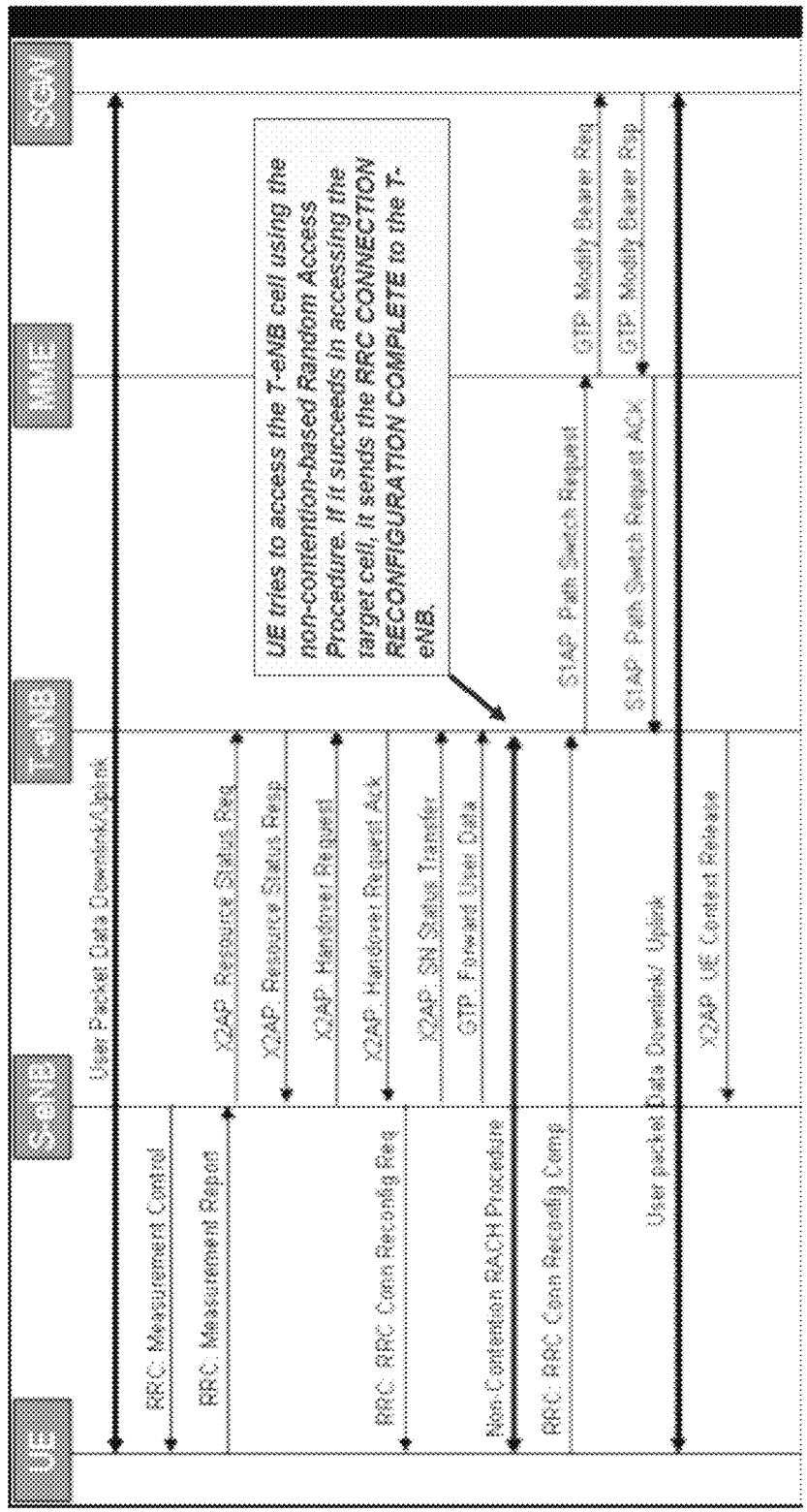
FIG. 1D is a diagram showing aspects of certain conventional LTE X2 Handover Call-Flow operations.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of the eNB and/or UE of FIG. 1A; some or all of the functions of FIGS. 1B and/or 1C; some or all of the subsystems and functions of the UE, source eNB (S-eNB), target eNB (T-eNB), mobility management entity (MME) and/or serving gateway (SGW) of FIG. 1D; some or all of the functions of FIG. 1E; some or all of the subsystems and functions of communication network 200 of FIG. 2A; some or all of the steps of method 2000 of FIG. 2B; some or all of the steps of method 2100 of FIG. 2C; and/or some or all of the steps of method 2200 of FIG. 2D. For example, virtualized communication network 300 can facilitate in whole or in part various DRX mode operational efficiency aspects described herein (e.g., power savings).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements which are typically integrated to perform a single function, the virtualized communication network employs virtual network elements (VNEs) 330, 332, 334, etc that perform some or all of the functions of network elements 250, 252, 254, 256, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 250 (shown in FIG. 2A), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 210, wireless access 220, voice access 230, media access 240 and/or access to content sources 275 for distribution of content to any or all of the access technologies. In particular, in some cases a network element needs to be positioned at a specific place, and this allows for less sharing of common infrastructure. Other times, the network elements have specific physical layer adapters that cannot be abstracted or virtialized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
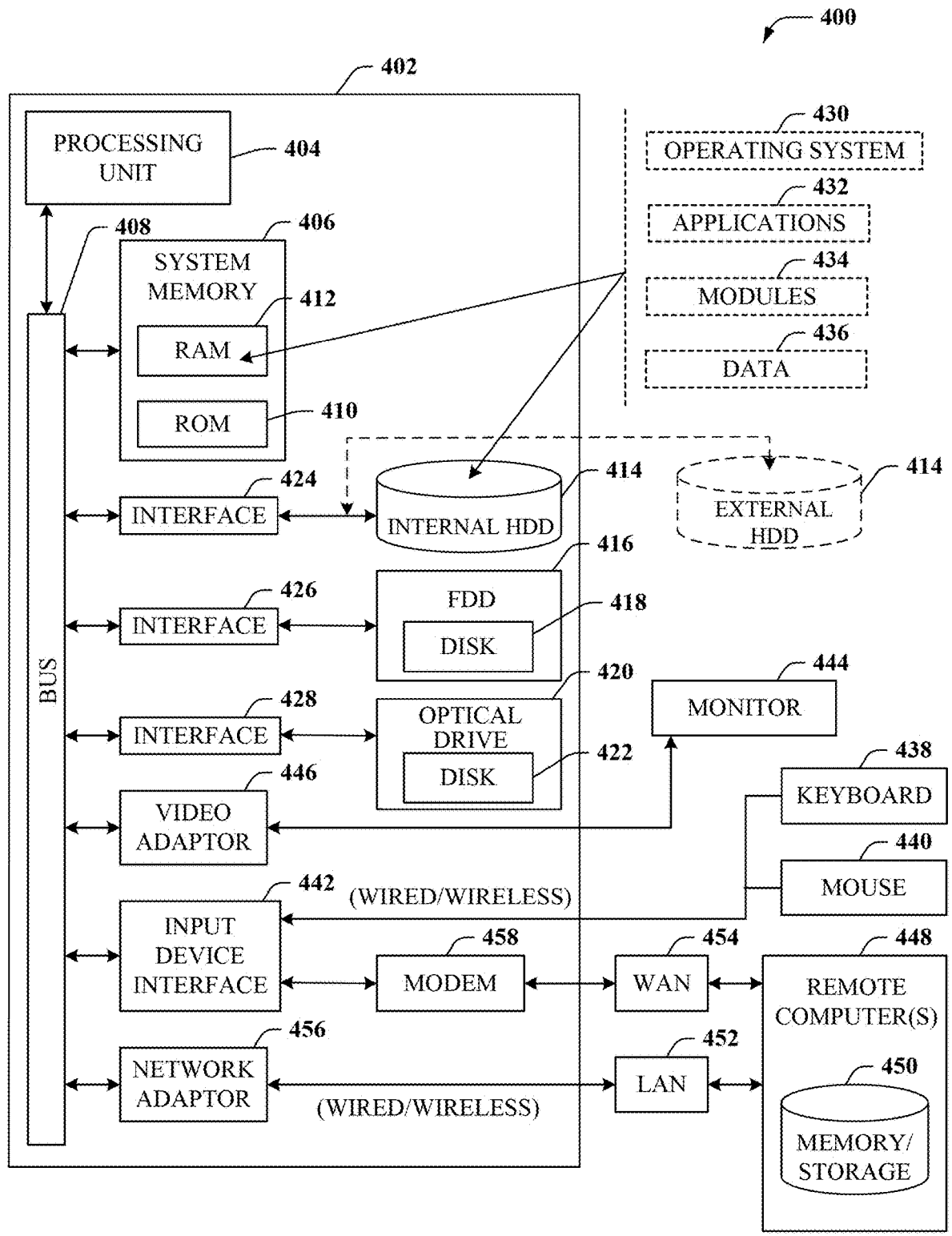
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein. FIG. 4 and the following discussion are intended to provide a brief, general description of a suitable computing environment 400 in which the various embodiments of the subject disclosure can be implemented. In particular, computing environment 400 can be used in the implementation of network elements 250, 252, 254, 256, access terminal 212, base station or access point 222, switching device 232, media terminal 242, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part various DRX mode operational efficiency aspects described herein (e.g., power savings).

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. WiFi is a wireless technology similar to that used in a cell phone that enables such devices, e.g., computers, to send and receive data indoors and out anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
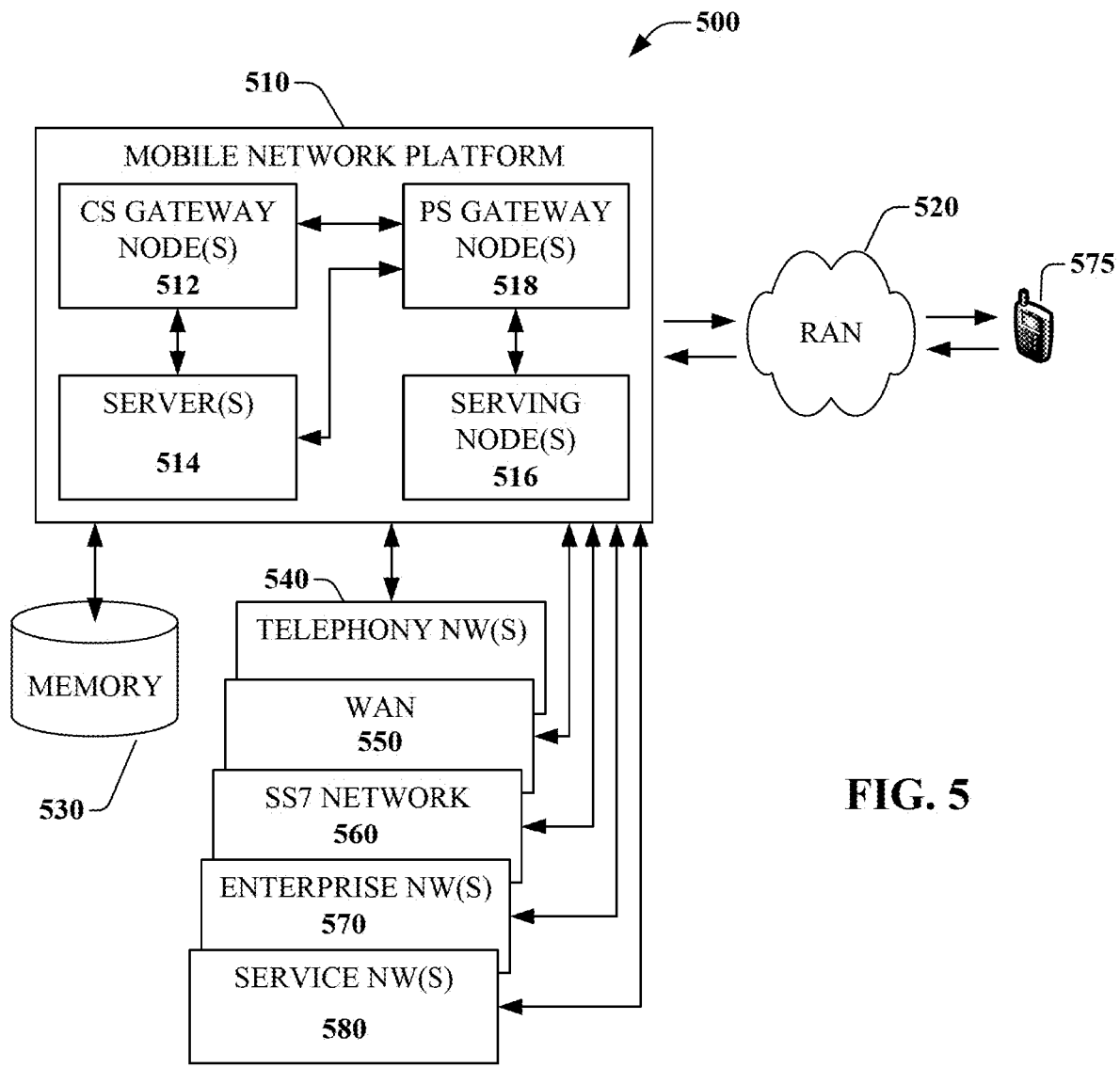
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 250, 252, 254, 256, and/or VNEs 330, 332, 334, etc. For example, platform 510 can facilitate in whole or in part various SRX mode operational efficiency aspects described herein (e.g., power savings). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UNITS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictate by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g. tunnel termination gateway (TTG) in 3GPP UMTS networks) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UNITS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter. FIG. 5, and the following discussion, are intended to provide a brief general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
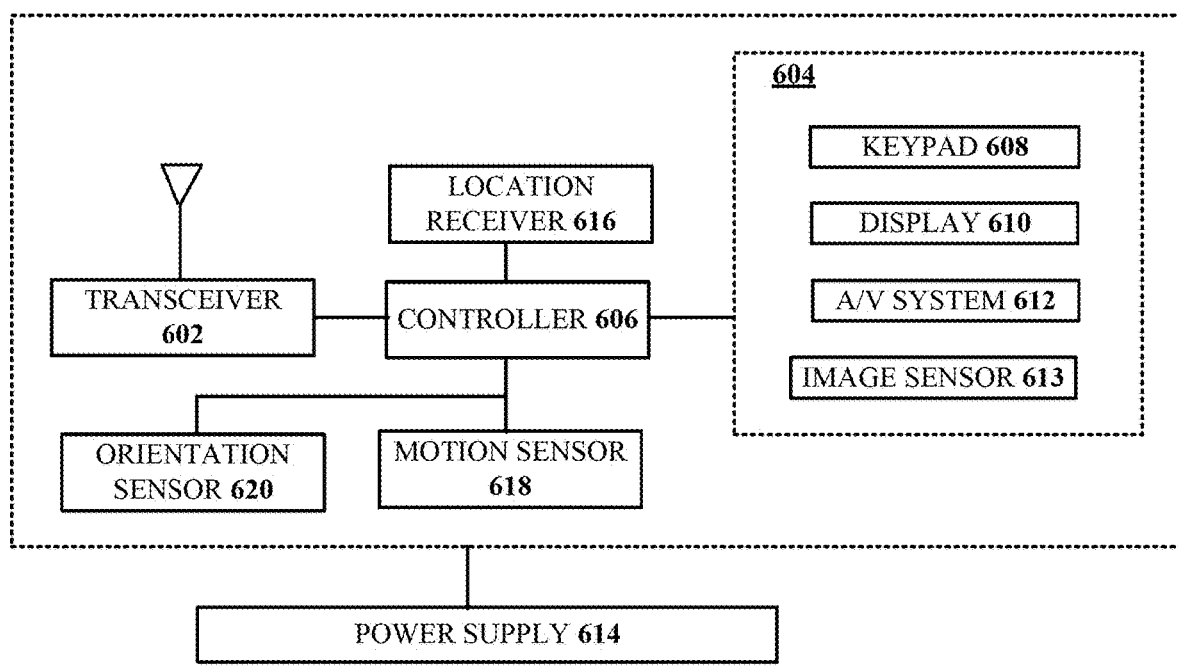
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 214, mobile devices 224, vehicle 226, display devices 244 or other client devices for communication via either communications network 225. For example, computing device 600 can facilitate in whole or in part various DRX mode operational efficiency aspects described herein (e.g., power savings).

The communication device 600 can comprise a wireline and or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDM/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) an for signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card Or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM) electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically implementing various DRX mode operational efficiency aspects described herein (e.g., power savings)) can employ various AI-based schemes for carrying out various embodiments thereof. Moreover, a classifier can be employed to determine a ranking or priority (e.g., in the context of various DRX mode operational efficiency aspects described herein (e.g., power savings)). A classifier is a function that maps an input attribute vector, x=(x1, x2, x3, x4 . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, teens such as "user equipment," "mobile station," "mobile," subscriber station," "access terminal." "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing tennis are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening, items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
   a processing system including a processor; and
   a memory that stores executable instructions that, when executed by the processing system, facilitate performance of operations, the operations comprising:
   detecting a transit speed of the device, resulting in a detected transit speed;
   responsive to the detected transit speed satisfying a first threshold, including information in a message related to a handover request between a first access point of a network and a second access point of the network, the information being indicative of an amount of time that the device has been in a Discontinuous Reception (DRX) mode; and
   sending, to the first access point with which the device communicates and is transitioning away from, the message including the information that is indicative of the amount of time that the device has been in the DRX mode.

2. The device of claim 1, wherein the operations further comprise:
   detecting a number of handovers that the device has experienced, resulting in a detected number of handovers;
   wherein the detecting the transit speed of the device is responsive to the detected number of handovers satisfying a second threshold.

3. The device of claim 2, wherein:
   the including of the information that is indicative of the amount of time that the device has been in the DRX mode is responsive to the detected transit speed being greater than the first threshold; and
   the detected number of handovers satisfying the second threshold comprises the detected number of handovers being greater than the second threshold.

4. The device of claim 1, wherein the detecting comprises detecting via a Global Positioning System (GPS) signal, detecting via network triangulation, or any combination thereof.

5. The device of claim 1, wherein the message related to the handover request is a Handover Request message, and wherein the information that is indicative of the amount of time that the device has been in the DRX mode is included in the Handover Request message via a first field of the Handover Request message.

6. The device of claim 5, wherein the operations further comprise including in the Handover Request message a flag indicating a high transit speed of the device, the flag being included in the Handover Request message via a second field of the Handover Request message.

7. The device of claim 1, wherein the device comprises a cellphone, a tablet, a laptop computer, or any combination thereof.

8. The device of claim 1, wherein the network comprises a 4G network, a 5G network, or any combination thereof.

9. The device of claim 8, wherein the first access point comprises a first evolved node B (eNB).

10. The device of claim 9, wherein the first eNB sends, to the second access point, user equipment information including updated timer information, wherein the second access point is a target eNB to which the device is to be handed off, and wherein the sending of the user equipment information to the target eNB facilitates the target eNB in turn sending the updated timer information to the device.

11. A non-transitory machine-readable medium comprising executable instructions that, when executed by a processing system of a first portion of a network including a processor, facilitate performance of operations, the operations comprising:
   receiving from a mobile communication device a message related to a handover request between the first portion of the network and a second portion of the network, the message including therein first information from the mobile communication device indicative of a first amount of time that the mobile communication device has been in a Discontinuous Reception (DRX) mode;

determining a second amount of time based on an initial DRX inactivity timer value;

generating second information, the second information based on a difference between the second amount of time and the first amount of time; and sending, to the second portion of the network, the second information.

12. The non-transitory machine-readable medium of claim 11, wherein the first portion of the network is a first access point, wherein the second portion of the network is a second access point, and wherein the second information that is sent to the second access point comprises a user equipment context associated with the mobile communication device.

13. The non-transitory machine-readable medium of claim 11, wherein the mobile communication device comprises a cellphone, a tablet, a laptop computer, or any combination thereof.

14. The non-transitory machine-readable medium of claim 11, wherein the network comprises a 4G network, a 5G network, or any combination thereof.

15. The non-transitory machine-readable medium of claim 11, wherein the first portion of the network comprises a first evolved node B (eNB) and wherein the second portion of the network comprises a second eNB.

16. The non-transitory machine-readable medium of claim 15, wherein the second eNB is a target eNB to which the mobile communication device is to be handed off, and wherein the sending of the second information to the target eNB facilitates the target eNB in turn sending updated timer information to the mobile communication device.

17. A method, comprising:

receiving, by a processing system of a first evolved node B (eNB) including a processor, user equipment information associated with a mobile communication device, the user equipment information being received from a second eNB that is in communication with the mobile communication device, the user equipment information comprising an updated timer value, the updated timer value having been calculated by the second eNB based upon an amount of time that the mobile communication device had been in a Discontinuous Reception (DRX) mode; and transmitting, by the processing system, a message to the mobile communication device, the message including the updated timer value.

18. The method of claim 17, wherein the message is an RRC Connection Reconfiguration message, an RRC Connection Setup message, or any combination thereof.

19. The method of claim 17, wherein the transmitting of the message to the mobile communication device enables the mobile communication device to save power based upon operation taking into account the updated timer value.

20. The method of claim 17, wherein the first eNB is a target eNB to which the mobile communication device is to be handed off, and wherein the second eNB is a source eNB with which the mobile communication device communicates prior to being handed off.

* * * * *